United States Patent
Ito

(10) Patent No.: US 11,913,552 B2
(45) Date of Patent: Feb. 27, 2024

(54) SEALING DEVICE AND GEAR REDUCER

(71) Applicant: NOK CORPORATION, Tokyo (JP)

(72) Inventor: Saki Ito, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 17/908,085

(22) PCT Filed: Feb. 18, 2021

(86) PCT No.: PCT/JP2021/006076
§ 371 (c)(1),
(2) Date: Aug. 30, 2022

(87) PCT Pub. No.: WO2021/182057
PCT Pub. Date: Sep. 16, 2021

(65) Prior Publication Data
US 2023/0089005 A1    Mar. 23, 2023

(30) Foreign Application Priority Data
Mar. 10, 2020    (JP) .................................. 2020-041025

(51) Int. Cl.
*F16J 15/18* (2006.01)
*F16J 15/3232* (2016.01)

(52) U.S. Cl.
CPC ......... *F16J 15/182* (2013.01); *F16J 15/3232* (2013.01)

(58) Field of Classification Search
CPC .... F16J 15/00; F16J 15/16; F16J 15/50; F16J 15/52; F16J 15/18; F16J 15/182;
(Continued)

(56) References Cited

U.S. PATENT DOCUMENTS

| 4,799,808 A | * | 1/1989 | Otto | F16C 33/7823 |
| | | | | 277/575 |
| 5,553,870 A | * | 9/1996 | Czekansky | F16C 33/7823 |
| | | | | 277/565 |

FOREIGN PATENT DOCUMENTS

| CN | 203823070 U | * | 9/2014 |
| JP | 5-30638 | | 4/1993 |

(Continued)

OTHER PUBLICATIONS

International Search Report issued in International Patent Application No. PCT/JP2021/006076, dated Apr. 13, 2021, along with an English translation thereof.

(Continued)

*Primary Examiner* — Nathan Cumar
(74) *Attorney, Agent, or Firm* — Greenblum & Bernstein, P.L.C.

(57) ABSTRACT

A sealing device acts to seal a gap between a housing of a gear reducer and a rotational shaft that bi-directionally rotates, and separates an internal space of the housing in which a grease is stored from an atmosphere side. The sealing device includes a main seal lip protruding radially inward from an inner peripheral surface of an inner cylindrical portion. The main seal lip has an internal-side inclined surface disposed on a side of the internal space and an atmosphere-side inclined surface disposed on the atmosphere side. An auxiliary seal lip protrudes radially inward and toward the internal space from the internal-side inclined surface of the main seal lip. Multiple first spiral structures and multiple second spiral structures are formed on at least one of the atmosphere-side inclined surface of the main seal lip and an inner peripheral surface of the auxiliary seal lip.

6 Claims, 3 Drawing Sheets

(58) Field of Classification Search
CPC .... F16J 15/32; F16J 15/32204; F16J 15/3208; F16J 15/3212; F16J 15/3216; F16J 15/322; F16J 15/3224; F16J 15/3228; F16J 15/3232; F16J 15/3236
USPC .......................................................... 277/549
See application file for complete search history.

(56) References Cited

FOREIGN PATENT DOCUMENTS

| | | | |
|---|---|---|---|
| JP | H0530638 | * | 4/1993 |
| JP | 2000-110946 | | 4/2000 |
| JP | 2011-89609 | | 5/2011 |
| JP | 3188680 | | 1/2014 |
| JP | 2015-081658 | | 4/2015 |
| JP | 2017025944 A | * | 2/2017 |

OTHER PUBLICATIONS

Extended European Search Report received in European patent application No. 21767803.6, dated Jul. 31, 2023.

* cited by examiner

SEALING DEVICE AND GEAR REDUCER

TECHNICAL FIELD

The present invention relates to sealing devices and to gear reducers.

BACKGROUND ART

A link (e.g., an arm) of an articulated robot can be rotated by a motor either directly or via a gear reducer. In this specification, "rotation" is intended to include not only rotation over an angular range of 360 degrees or more, but also rotation in a limited angular range of less than 360 degrees. Robot links often rotate in both directions in an angular range of less than 360 degrees.

An oil seal for use in a gear reducer for driving a link in an articulated robot is known (Patent Document 1). Such an oil seal acts to seal the gap between a rotational shaft disposed in a case and the case.

BACKGROUND DOCUMENT(S)

Patent Document(s)

Patent Document 1: JP-A-2011-89609

SUMMARY OF THE INVENTION

In gear reducers, the flow pressure of grease sealed in the internal space of the housing partially rises partially due to rotation of parts. As a result, there is a likelihood that the grease will leak from the internal space over the seal lip of a sealing device. It is known that the seal lip, which is disposed between parts that rotate relative to each other, has an effect of returning a liquid that leaked from a predetermined space back to the predetermined space (pumping effect).

However, since the rotational speed of a rotational shaft on the output side, such as the final output shaft of a gear reducer is generally very low, it is difficult to obtain a pumping effect of the seal lip.

The seal lip of a sealing device in a gear reducer is exposed to gear wear particles and sludge in the grease. Even in such environments with a lot of foreign matter, there is a demand to minimize grease leakage from the internal space of the gear reducer to the atmosphere side.

Accordingly, the present invention provides a sealing device and a gear reducer capable of minimizing grease leakage from the internal space of a gear reducer to the atmosphere side even in environments with a lot of foreign matter.

In an aspect of the present invention, there is provided a sealing device acting to seal a gap between a housing of a gear reducer and a rotational shaft that is disposed in a hole in the housing and that bi-directionally rotates, the sealing device separating an internal space of the housing in which a grease is stored from an atmosphere side. The sealing device includes an outer cylindrical portion adapted to be mounted on the housing; an inner cylindrical portion located radial inside the outer cylindrical portion; a connecting circular annular portion connecting an atmosphere-side end of the outer cylindrical portion and an atmosphere-side end of the inner cylindrical portion in radial directions; a main seal lip protruding radially inward from an inner peripheral surface of the inner cylindrical portion and having an internal-side inclined surface disposed on a side of the internal space and an atmosphere-side inclined surface disposed on the atmosphere side, the main seal lip being in slidable contact with an outer peripheral surface of the rotational shaft; an auxiliary seal lip protruding radially inward and toward the internal space from the internal-side inclined surface of the main seal lip, the auxiliary seal lip being in slidable contact with the outer peripheral surface of the rotational shaft; multiple first spiral structures formed on at least one of the atmosphere-side inclined surface of the main seal lip and an inner peripheral surface of the auxiliary seal lip and extending obliquely; and multiple second spiral structures formed on at least one of the atmospheric inclined surface of the main seal lip and the inner peripheral surface of the auxiliary seal lip and extending obliquely and symmetrically to the first spiral structures.

In an aspect of the present invention, there is provided a gear reducer including a housing of a gear reducer having an internal space in which a grease is stored; a rotational shaft that is disposed in a hole in the housing and that bi-directionally rotates; and a sealing device acting to seal a gap between the housing and the rotational shaft, the sealing device separating the internal space of the housing from an atmosphere side. The sealing device includes an outer cylindrical portion mounted on the housing; an inner cylindrical portion located radial inside the outer cylindrical portion; a connecting circular annular portion connecting an atmosphere-side end of the outer cylindrical portion and an atmosphere-side end of the inner cylindrical portion in radial directions; a main seal lip protruding radially inward from an inner peripheral surface of the inner cylindrical portion and having an internal-side inclined surface disposed on a side of the internal space and an atmosphere-side inclined surface disposed on the atmosphere side, the main seal lip being in slidable contact with an outer peripheral surface of the rotational shaft; an auxiliary seal lip protruding radially inward and toward the internal space from the internal-side inclined surface of the main seal lip, the auxiliary seal lip being in slidable contact with the outer peripheral surface of the rotational shaft; multiple first spiral structures formed on at least one of the atmosphere-side inclined surface of the main seal lip and an inner peripheral surface of the auxiliary seal lip and extending obliquely; and multiple second spiral structures formed on at least one of the atmospheric inclined surface of the main seal lip and the inner peripheral surface of the auxiliary seal lip and extending obliquely and symmetrically to the first spiral structures.

In the above-described aspects, an auxiliary seal lip protrudes from the internal-side inclined surface of the main seal lip radially inward and toward the internal space side. The auxiliary seal lip is brought into contact with the outer peripheral surface of the rotational shaft and prevents foreign matter such as gear wear particles and sludge in the grease within the internal space of the housing from moving toward the main seal lip. Because of the auxiliary seal lip, foreign matter is restrained from entering the minute gap between the main seal lip and the rotational shaft, so that creation of large gaps therebetween and excessive abrasion of the main seal lip can be reduced. Therefore, grease leakage from the internal space of the gear reducer to the atmosphere side is minimized even in environments with a lot of foreign matter.

In addition, the first spiral structures and the second spiral structures are formed on at least one of the main seal lip and the auxiliary seal lip. When the rotational shaft rotates in a first direction, even if grease leaks beyond the lip from the internal space side to the atmosphere side, the first spiral structures return the grease back to the internal space side.

Conversely, when the rotational shaft rotates in a second direction, the second spiral structures return the grease that have leaked to the atmosphere side back to the internal space side. Even when the rotational speed of the rotational shaft is very low, the spiral structures, which promote the pumping effect, can return the grease to the internal space. Therefore, leakage of grease from the internal space of the gear reducer to the atmosphere side is minimized.

DESCRIPTION OF EMBODIMENT

Hereinafter, various embodiments of the invention will be described with reference to the accompanying drawings. It is of note that the drawings are not necessarily to scale, and certain features may be exaggerated or omitted.

Figure 1:
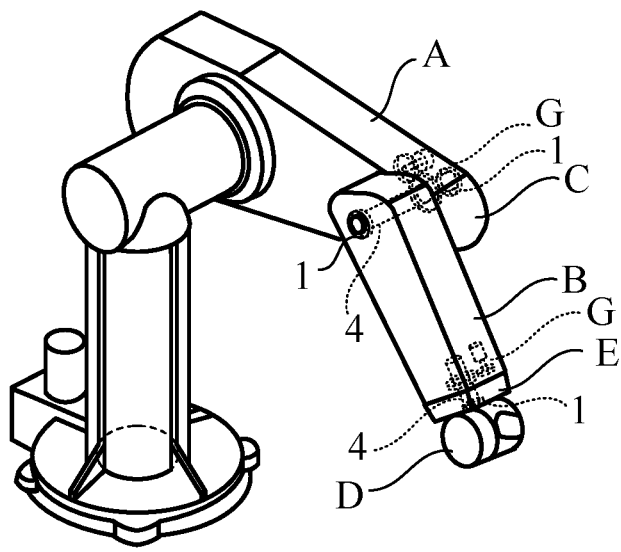
FIG. 1 is a perspective view of an articulated robot in which a sealing device according to an embodiment of the present invention is used.

As shown in FIG. 1, a sealing device 1 according to an embodiment of the present invention is provided in, for example, a joint C between a link (arm) A and a link (arm) B, a joint E between a link (arm) B and a link (hand) D, etc. in an industrial articulated robot.

Figure 2:
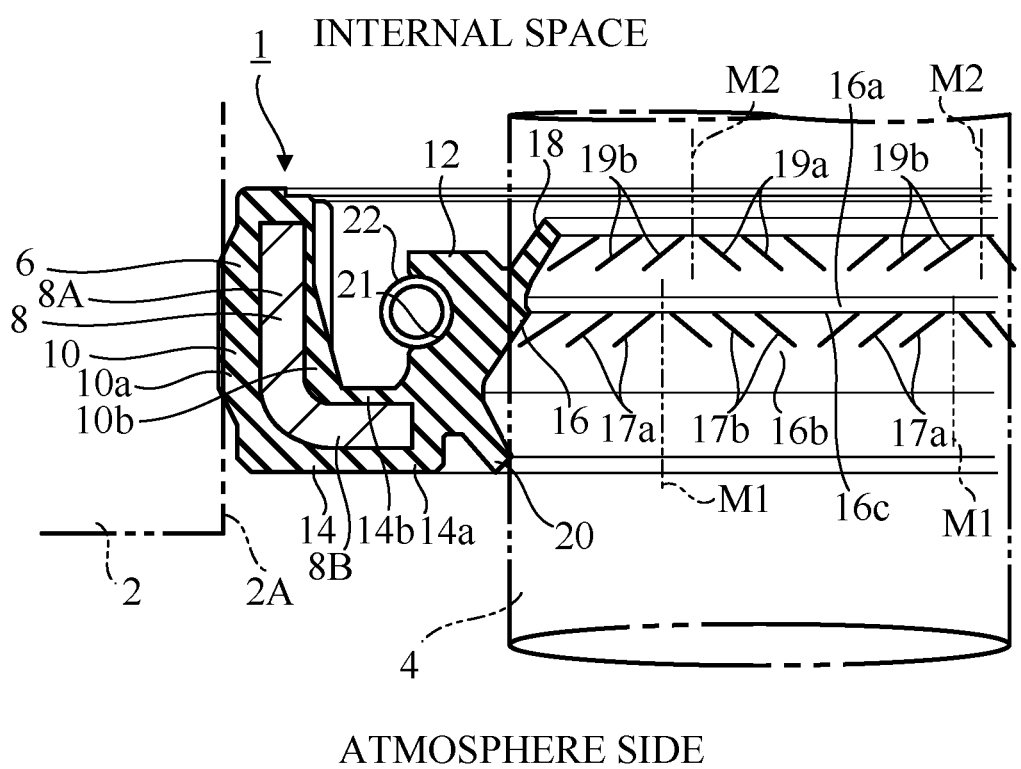
FIG. 2 is a partial cross-sectional view showing a sealing device according to an embodiment of the present invention.

As shown in FIGS. 1 and 2, the sealing device 1 according to the embodiment of the present invention acts to seal a gap between a housing 2 of a gear reducer G and a rotational shaft 4 disposed in a hole 2A in the housing 2, and separates the internal space of the housing 2 from the atmosphere side. The rotational shaft 4 is a shaft for driving a link (e.g., arm) of the robot. The rotational shaft 4 is rotatably supported by bearings (not shown) and is coaxially located in the hole 2A. The rotational shaft 4 may be the final output shaft of the gear reducer G or any other rotational shaft in a gear reducer. The rotational shaft 4 rotates bi-directionally in an angular range of less than 360 degrees about the axis of the rotational shaft 4 itself.

The rotational shaft 4 is cylindrical, the hole 2A has a circular cross section, and the sealing device 1 is annular, but only respective left halves are shown.

The housing 2 and the rotational shaft 4 are shown in phantom lines. In the use state, in which the sealing device 1 is deployed in the gap between the housing 2 and the rotational shaft 4, the sealing device 1 (in particular, lips 16, 18, and 20) is radially compressed and deformed. FIG. 2 shows the lips 16, 18, and 20 in their initial state, which are not in contact with the rotational shaft 4 and are not deformed.

The sealing device 1 has a composite structure having an elastic ring 6 and a rigid ring 8. The elastic ring 6 is made from an elastic material, e.g., an elastomer. The rigid ring 8 is made from a rigid material, e.g., a metal, and reinforces the elastic ring 6. The rigid ring 8 has an L-shaped cross section and has a sleeve 8A and a circular annular portion 8B extending radially inward from the end (atmosphere-side end) of the sleeve 8A on the atmosphere side.

The sealing device 1 includes an outer cylindrical portion 10, an inner cylindrical portion 12, a connecting circular annular portion 14, a main seal lip 16, an auxiliary seal lip 18, and a dust lip 20.

The outer cylindrical portion 10 is adapted to be mounted on the housing 2. Although the mounting scheme is not limited, for example, the outer cylindrical portion 10 may be interference fitted into the hole 2A. The outer cylindrical portion 10 is formed of the elastic ring 6 and the rigid ring 8. More specifically, in the outer cylindrical portion 10, the elastic ring 6 is adhered to the entirety of the outer peripheral surface of the sleeve 8A of the rigid ring 8, and is also adhered to the entirety of the inner peripheral surface of the sleeve 8A of the rigid ring 8. Thus, the outer cylindrical portion 10 has an elastic portion 10a that covers the entirety of the outer peripheral surface of the sleeve 8A and an elastic portion 10b that covers the entirety of the inner peripheral surface of the sleeve 8A. However, it is not absolutely necessary to cover the inner peripheral surface of the sleeve 8A with an elastic material.

The inner cylindrical portion 12 is formed of only of the elastic ring 6 and is located radial inside the outer cylindrical portion 10. The inner cylindrical portion 12 overlaps the outer cylindrical portion 10 in radial directions.

The connecting circular annular portion 14 connects the atmosphere-side end of the outer cylindrical portion 10 and the atmosphere-side end of the inner cylindrical portion 12 in radial directions. The connecting circular annular portion 14 is formed of the elastic ring 6 and the rigid ring 8. More specifically, in the connecting circular annular portion 14, the elastic ring 6 is adhered to the entirety of the atmosphere-side surface of the circular annular portion 8B of the rigid ring 8, and is also adhered to the inner-space-side surface of the circular annular portion 8B of the rigid ring 8. Thus, the connecting circular annular portion 14 has an elastic portion 14a that covers the entirety of the atmosphere-side surface of the circular annular portion 8B and an elastic portion 14b that covers the entirety of the inner-space-side surface of the circular annular portion 8B.

The main seal lip 16 is a projection that protrudes radially inward from the inner peripheral surface of the inner cylindrical portion 12, and has a truncated conical internal-side inclined surface 16a disposed on the side of the internal space, a truncated conical atmosphere-side inclined surface 16b disposed on the atmosphere side, and a lip edge 16c that is located at the boundary between the internal-side inclined surface 16a and the atmosphere-side inclined surface 16b and that extends in a circumferential direction. The main seal lip 16 is formed of only the elastic ring 6.

The internal-side inclined surface 16a is inclined such that the further from the lip edge 16c, farther from the rotational shaft 4. The atmosphere-side inclined surface 16b is also inclined such that the further from the lip edge 16c, farther from the rotational shaft 4. In the use state, in which the sealing device 1 is deployed in the gap between the housing 2 and the rotational shaft 4, the lip edge 16c and the vicinity thereof in the main seal lip 16 are always in slidable contact with the outer peripheral surface of the rotational shaft 4.

The auxiliary seal lip 18 protrudes radially inward and toward the internal space side from the internal-side inclined surface 16a of the main seal lip 16. The auxiliary seal lip 18 is a thin plate having a truncated cone shape. In the use state, in which the sealing device 1 is deployed in the gap between the housing 2 and the rotational shaft 4, the distal end of the auxiliary seal lip 18 is brought into slidable contact with the outer peripheral surface of the rotational shaft 4. The auxiliary seal lip 18 if formed of only the elastic ring 6.

The main seal lip 16 and the auxiliary seal lip 18 are provided to seal grease in the internal space of the housing 2.

In the initial state in which the lips 16 and 18 are not in contact with the rotational shaft 4 and are not deformed, as shown in FIG. 2, the diameter of the circle formed by the distal end of the auxiliary seal lip 18 is less than the diameter of the lip edge 16c. However, the diameter of the circle formed by the distal end of the auxiliary seal lip 18 may be greater than or equal to the diameter of the lip edge 16c.

The dust lip 20 is a truncated conical plate extending obliquely (radially inward and toward the atmosphere side) from the connecting portion of the connecting circular annular portion 14 and the inner cylindrical portion 12. The dust lip 20 is formed of only of the elastic ring 6. The dust lip 20 overlaps the circular annular portion 8B of the rigid ring 8 in radial directions. The dust lip 20 is provided to inhibit ingress of foreign matter (including water or dust) from the atmosphere side to the internal space side.

In this embodiment, the distal end of the dust lip 20 is brought into slidable contact with the outer peripheral surface of the rotational shaft 4 to reduce the ingress of foreign matter. However, in order to reduce the torque exerted by the sealing device 1 on the rotational shaft 4, the dust lip 20 need not be in contact with the rotational shaft 4.

A circumferential groove 21 is formed on the outer peripheral surface of the inner cylindrical portion 12, and a garter spring 22 is disposed in the circumferential groove 21. The garter spring 22 presses the main seal lip 16 and the auxiliary seal lip 18 radially inwardly.

In the sealing device 1 of the gear reducer, the main seal lip 16 should be brought into contact with the rotational shaft 4 with a high binding force. For this reason, the inner cylindrical portion 12 has a greater thickness than that of inner cylindrical portions in sealing devices for other use applications, and the garter spring 22 is arranged around the inner cylindrical portion 12.

In this embodiment, the auxiliary seal lip 18 protrudes from the internal-side inclined surface 16a of the main seal lip 16 radially inward and toward the internal space side. The auxiliary seal lip 18 is brought into contact with the outer peripheral surface of the rotational shaft 4 and prevents foreign matter such as gear wear particles and sludge in the grease within the internal space of the housing 2 from moving toward the main seal lip 16. Because of the auxiliary seal lip 18, foreign matter is restrained from entering the minute gap between the main seal lip 16 and the rotational shaft 4, so that creation of large gaps therebetween and excessive abrasion of the main seal lip 16 can be reduced. Therefore, grease leakage from the internal space of the gear reducer to the atmosphere side is minimized even in environments with a lot of foreign matter.

Multiple first spiral ribs (first spiral structures) 17a and multiple second spiral ribs (second spiral structures) 17b are formed on the atmosphere-side inclined surface 16b of the main seal lip 16. The spiral ribs 17a and 17b achieve pumping effect to return grease that leaked from the internal space side over the lip edge 16c to the atmosphere side back to the internal space side as the rotational shaft 4 rotates, as described in Japanese Patent No. 4702517. In other words, even if grease leaks beyond the main seal lip 16 from the internal space side to the atmosphere side, the spiral ribs 17a and 17b return the grease to the internal space side when the rotational shaft 4 rotates.

Figure 3:
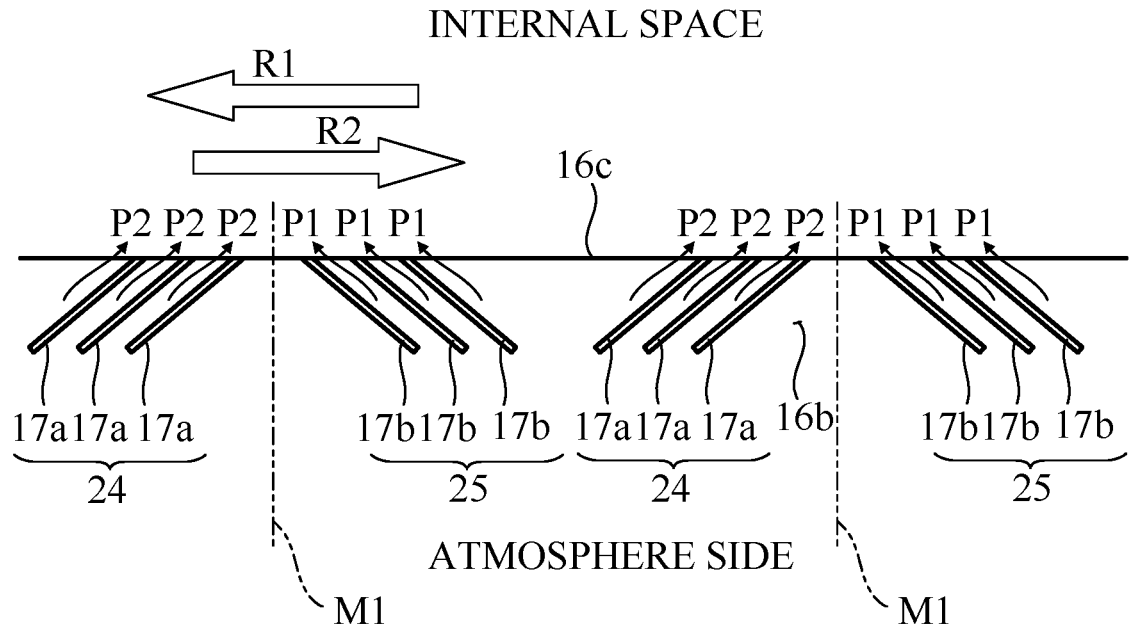
FIG. 3 is a development view of an inner peripheral surface of a main seal lip of the sealing device according to the embodiment.

FIG. 3 is a development view of the inner peripheral surface of the main seal lip 16. Although only a part of the inner peripheral surface of the main seal lip 16 is shown in FIG. 3, the atmosphere-side inclined surface 16b has multiple groups 24, each of which consists of multiple first spiral ribs 17a, and multiple groups 25 each of which consists of multiple second spiral ribs 17b. The groups 24 and 25 are arranged alternately in the circumferential direction.

The first spiral ribs 17a and the second spiral ribs 17b extend from the lip edge 16c in an inclined and spiral manner relative to the lip edge 16c. In this embodiment, the first spiral ribs 17a and the second spiral ribs 17b are straight ridges. The second spiral ribs 17b are reflection symmetrical to the first spiral ribs 17a and extends obliquely from the lip edge 16c. The reflection symmetry plane M1 is a plane that is located between two adjacent groups 24 and 25 (the first spiral ribs 17a and the second spiral ribs 17b) and that contains the axis of the rotational shaft 4.

In the use state, in which the main seal lip 16 is in contact with the rotational shaft 4, at least the vicinities of the lip edge 16c in the first spiral ribs 17a and the second spiral ribs 17b are in contact with the outer peripheral surface of the rotational shaft 4.

As described above, the rotational shaft 4 rotates bi-directionally about the axis of the rotational shaft 4 itself. The first spiral ribs 17a and the second spiral ribs 17b having different orientations are formed on the main seal lip 16 for achieving the pumping effect in the bi-directional rotation. More specifically, when the rotational shaft 4 rotates in the first direction R1 in FIG. 3, the first spiral ribs 17a return liquid from the atmosphere side to the internal space side, as indicated by arrow P1. Conversely, when the rotational shaft 4 rotates in the second direction R2, the second spiral ribs 17b return liquid from the atmosphere side to the internal space side, as indicated by arrow P2. It is understood that such pumping effect is caused by microscopic unevenness on the atmosphere-side inclined surface 16b, and that the spiral ribs 17a and 17b promote the pumping effect depending on their respective orientations. Even when the rotational speed of the rotational shaft 4 is very low, the spiral ribs 17a and 17b, which contribute to the pumping effect, can return the grease to the internal space. Therefore, leakage of grease from the internal space of the gear reducer to the atmosphere side is minimized.

In this embodiment, the spiral ribs 17a and 17b are ridges protruding from the atmosphere-side inclined surface 16b. However, the multiple spiral structures that promote the pumping effect may be multiple grooves formed on the atmosphere-side inclined surface 16b. In this case, multiple oblique grooves having the same orientation and multiple oblique grooves having orientations different from the former grooves are formed on the atmosphere-side inclined surface 16b.

As shown in FIG. 2, multiple first spiral ribs (first spiral structures) 19a and multiple second spiral ribs (second spiral structures) 19b are also formed on the inner peripheral surface of the auxiliary seal lip 18. The spiral ribs 19a and 19b achieve pumping effect to return grease that leaked from the internal space side over the distal end of the auxiliary seal lip 18 to the atmosphere side back to the internal space side as the rotational shaft 4 rotates. In other words, even if grease leaks beyond the auxiliary seal lip 18 from the internal space side to the atmosphere side, the spiral ribs 19a and 19b return the grease to the internal space side when the rotational shaft 4 rotates.

The development view of the inner peripheral surface of the auxiliary seal lip 18 is similar to the developed view of the inner peripheral surface of the main seal lip 16 in FIG. 3, and it is omitted. The inner peripheral surface of the auxiliary seal lip 18 has multiple groups, each of which consists of multiple first spiral ribs 19a, and multiple groups each of which consists of multiple second spiral ribs 19b. The groups are arranged alternately in the circumferential direction.

The first spiral ribs 19a and the second spiral ribs 19b extend from the distal end of the auxiliary seal lip 18 in an inclined and spiral manner relative to the circular distal end of the auxiliary seal lip 18. In this embodiment, the first spiral ribs 19a and the second spiral ribs 19b are straight ridges. The second spiral ribs 19b are reflection symmetrical to the first spiral ribs 19a and extends obliquely from the circular distal end of the auxiliary seal lip 18. The reflection symmetry plane M2 is a plane that is located between two adjacent different groups (the first spiral ribs 19a and the second spiral ribs 19b) and that contains the axis of the rotational shaft 4.

In the use state, in which the auxiliary seal lip 18 is in contact with the rotational shaft 4, at least the vicinities of the distal end of the auxiliary seal lip 18 in the first spiral ribs 19a and the second spiral ribs 19b are in contact with the outer peripheral surface of the rotational shaft 4.

When the rotational shaft 4 rotates in the first direction R1 in FIG. 3, the first spiral ribs 19a return liquid from the atmosphere side to the internal space. Conversely, when the rotational shaft 4 rotates in the second direction R2, the second spiral ribs 19b return liquid from the atmosphere side to the internal space. It is understood that such pumping effect is caused by microscopic unevenness on the inner peripheral surface of the auxiliary seal lip 18, and that the spiral ribs 19a and 19b promote the pumping effect depending on their respective orientations. Even when the rotational speed of the rotational shaft 4 is very low, the spiral ribs 19a and 19b, which contribute to the pumping effect, can return the grease to the internal space. Therefore, leakage of grease from the internal space of the gear reducer to the atmosphere side is minimized.

In this embodiment, the spiral ribs 19a and 19b are ridges protruding from the inner peripheral surface of the auxiliary seal lip 18. However, the multiple spiral structures that promote the pumping effect may be multiple grooves formed on the inner peripheral surface of the auxiliary seal lip 18. In this case, multiple oblique grooves having the same orientation and multiple oblique grooves having orientations different from the former grooves are formed on the inner peripheral surface of the auxiliary seal lip 18.

According to this embodiment, the first spiral structures and the second spiral structures are formed on both the main seal lip 16 and the auxiliary seal lip 18. This enables more grease that leaked from the internal space side to the atmosphere side to be returned to the internal space.

The auxiliary seal lip 18 does not have an opening that causes communication of the internal space side of the auxiliary seal lip 18 and the atmosphere side. The term "opening" means an opening (notch or hole) that penetrates the auxiliary seal lip 18 and that has a size greater than those of minute gaps between the auxiliary seal lip 18 and the outer peripheral surface of the rotational shaft 4 that occur when the auxiliary seal lip 18 is in contact with the outer peripheral surface of the rotational shaft 4. In other words, an "opening" is meant to exclude any one of microscopic openings between the auxiliary seal lip 18 and the outer peripheral surface of the rotational shaft 4 that are caused by microscopic unevenness on the inner peripheral surface of the auxiliary seal lip 18 and/or caused by ribs or grooves that are spiral structures. Since such large openings are not formed in the auxiliary seal lip 18, ingress of foreign matter existing in the internal space into minute gaps between the main seal lip 16 and the rotational shaft 4 is restrained.

Figure 4:
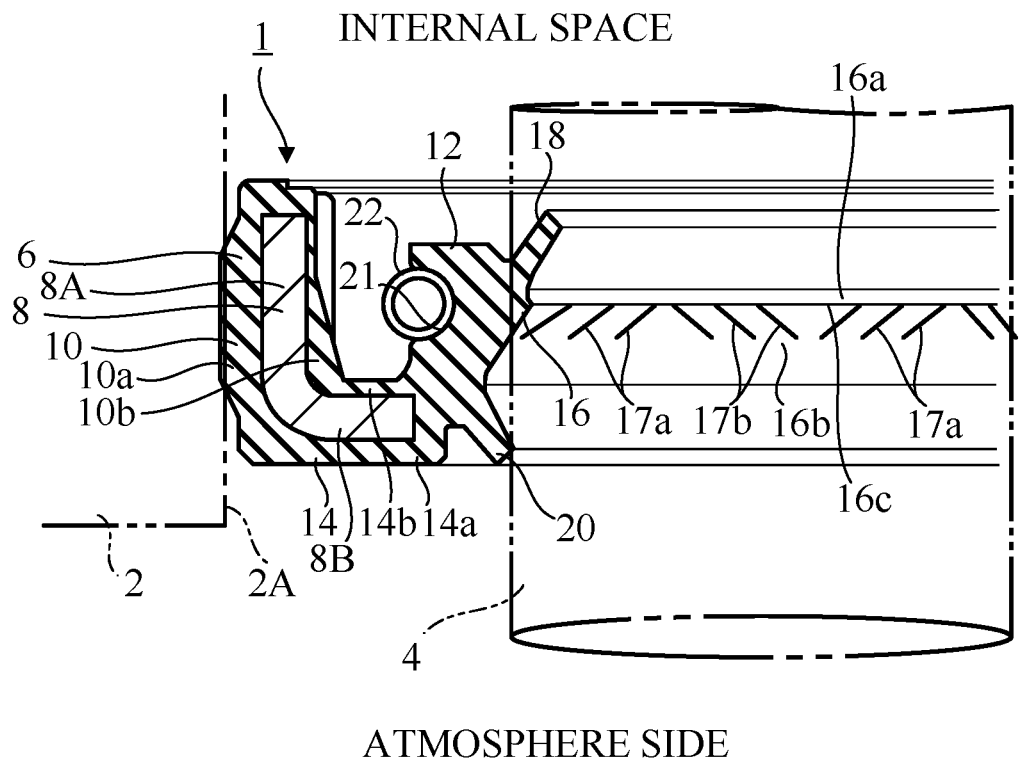
FIG. 4 is a partial cross-sectional view showing a sealing device according to a modification of the embodiment.

FIG. 4 shows a sealing device according to a modification of the embodiment. In this modification, the spiral ribs 17a and 17b are formed on the atmosphere-side inclined surface 16b of the main seal lip 16, whereas the spiral ribs 19a and 19b are not formed on the inner peripheral surface of the auxiliary seal lip 18.

Figure 5:
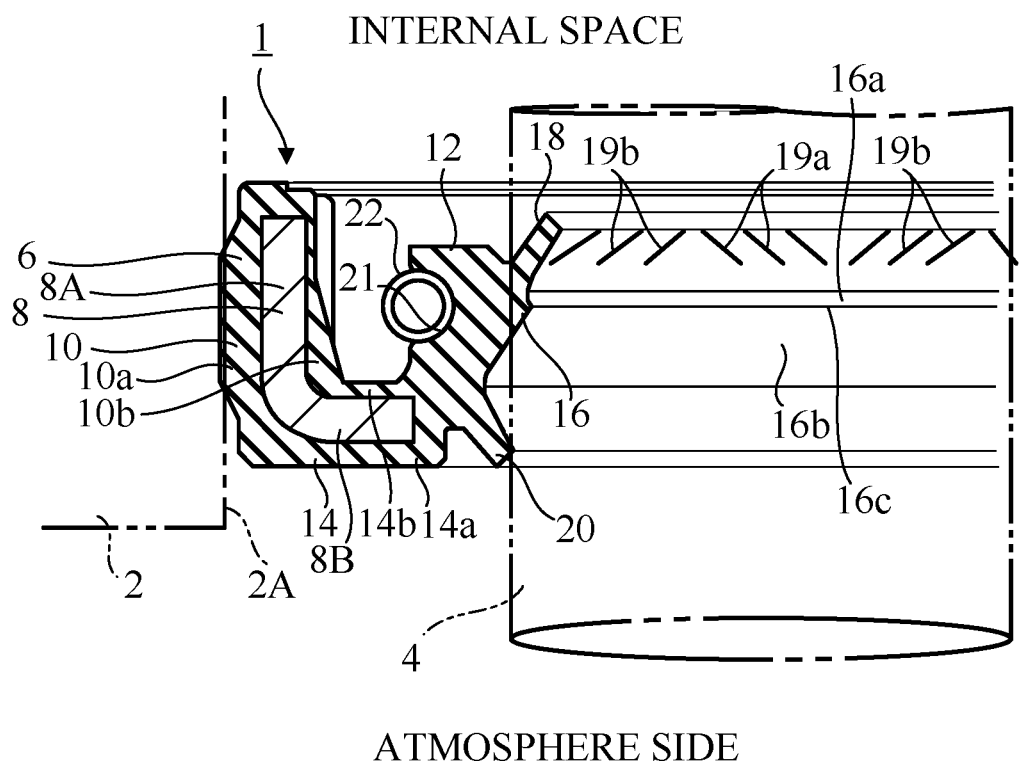
FIG. 5 is a partial cross-sectional view showing a sealing device according to another modification of the embodiment.

FIG. 5 shows a sealing device according to another modification. In this modification, the spiral ribs 19a and 19b are formed on the inner peripheral surface of the auxiliary seal lip 18, whereas the spiral ribs 17a and 17b are not formed on the atmosphere-side inclined surface 16b of the main seal lip 16.

Thus, the first and second spiral structures may be formed on at least one of the atmosphere-side inclined surface 16b of the main seal lip 16 and the inner peripheral surface of the auxiliary seal lip 18.

An embodiment of the present invention has been described. However, the foregoing description is not intended to limit the present invention, and various modifications including omission, addition, and substitution of structural elements may be made in so far as such modifications remain within the scope of the present invention.

For example, in the above-described embodiment, the sealing device acts to seal a gap between a housing 2 of a gear reducer and a rotational shaft 4 disposed in a hole 2A in the housing 2 in order to seal a grease within the internal space of the housing of the gear reducer that drives a link of an articulated robot. However, the sealing device may also be used to seal a grease within an internal space of the housing of another gear reducer. The sealing device may be used in various types of gear reducers, which include planetary gear reducers and wave gear reducers.

The shape and dimensions of the spiral ribs can be varied.

Another member (e.g., a sleeve) may be arranged around the rotational shaft 4, and the main seal lip 16 and auxiliary seal lip 18 may be in slidable contact with the outer peripheral surface of this member. In this case, the combination of the rotational shaft 4 and this member can be regarded as a rotational shaft.

Aspects of the present invention are also set out in the following numbered clauses:

Clause 1. A sealing device acting to seal a gap between a housing of a gear reducer and a rotational shaft that is disposed in a hole in the housing and that bi-directionally rotates, the sealing device separating an internal space of the housing in which a grease is stored from an atmosphere side, the sealing device comprising:

an outer cylindrical portion adapted to be mounted on the housing;

an inner cylindrical portion located radial inside the outer cylindrical portion;

a connecting circular annular portion connecting an atmosphere-side end of the outer cylindrical portion and an atmosphere-side end of the inner cylindrical portion in radial directions;

a main seal lip protruding radially inward from an inner peripheral surface of the inner cylindrical portion and having a truncated conical internal-side inclined surface disposed on a side of the internal space and a truncated conical atmosphere-side inclined surface disposed on the atmosphere side, the main seal lip being in slidable contact with an outer peripheral surface of the rotational shaft;

an auxiliary seal lip protruding radially inward and toward the internal space from the internal-side inclined surface of the main seal lip and having a truncated cone shape, the auxiliary seal lip being in slidable contact with the outer peripheral surface of the rotational shaft;

multiple first spiral structures formed on at least one of the atmosphere-side inclined surface of the main seal lip and an inner peripheral surface of the auxiliary seal lip and extending obliquely; and multiple second spiral structures formed on at least one of the atmospheric inclined surface of the main seal lip and the inner peripheral surface of the auxiliary seal lip and extending obliquely and symmetrically to the first spiral structures.

Clause 2. The sealing device according to clause 1, wherein the multiple first spiral structures are formed on both the atmosphere-side inclined surface of the main seal lip and the inner peripheral surface of the auxiliary seal lip, and wherein the multiple second spiral structures are formed on both the atmosphere-side inclined surface of the main seal lip and the inner peripheral surface of the auxiliary seal lip.

According to this clause, since the first and second spiral structures are formed on both the main seal lip and the auxiliary seal lip, more grease that leaked from the internal space side to the atmosphere side can be returned to the internal space.

Clause 3. The sealing device according to clause 1 or 2, wherein the auxiliary seal lip does not have an opening that causes communication of a side on the internal space of the auxiliary seal lip and the atmosphere side.

According to this clause, since an opening is not formed in the auxiliary seal lip, ingress of foreign matter existing in the internal space into minute gaps between the main seal lip and the rotational shaft is restricted.

Clause 4. A gear reducer comprising:

a housing having an internal space in which a grease is stored;

a rotational shaft that is disposed in a hole in the housing and that bi-directionally rotates; and a sealing device acting to seal a gap between the housing and the rotational shaft, the sealing device separating the internal space of the housing from an atmosphere side, the sealing device comprising:

an outer cylindrical portion mounted on the housing;

an inner cylindrical portion located radial inside the outer cylindrical portion;

a connecting circular annular portion connecting an atmosphere-side end of the outer cylindrical portion and an atmosphere-side end of the inner cylindrical portion in radial directions;

a main seal lip protruding radially inward from an inner peripheral surface of the inner cylindrical portion and having a truncated conical internal-side inclined surface disposed on a side of the internal space and a truncated conical atmosphere-side inclined surface disposed on the atmosphere side, the main seal lip being in slidable contact with an outer peripheral surface of the rotational shaft;

an auxiliary seal lip protruding radially inward and toward the internal space from the internal-side inclined surface of the main seal lip and having a truncated cone shape, the auxiliary seal lip being in slidable contact with the outer peripheral surface of the rotational shaft;

multiple first spiral structures formed on at least one of the atmosphere-side inclined surface of the main seal lip and an inner peripheral surface of the auxiliary seal lip and extending obliquely; and multiple second spiral structures formed on at least one of the atmospheric inclined surface of the main seal lip and the inner peripheral surface of the auxiliary seal lip and extending obliquely and symmetrically to the first spiral structures.

Clause 5. The gear reducer according to clause 4, wherein the multiple first spiral structures are formed on both the atmosphere-side inclined surface of the main seal lip and the inner peripheral surface of the auxiliary seal lip, and wherein the multiple second spiral structures are formed on both the atmosphere-side inclined surface of the main seal lip and the inner peripheral surface of the auxiliary seal lip.

Clause 6. The gear reducer according to clause 4 or 5, wherein the auxiliary seal lip does not have an opening that causes communication of a side on the internal space of the auxiliary seal lip and the atmosphere side.

REFERENCE SYMBOLS

1: Sealing device
2: Housing
2A: Hole
4: Rotational shaft
10: Outer cylindrical portion
12: Inner cylindrical portion
14: Connecting circular annular portion
16: Main seal lip
16a: Internal-side inclined surface
16b: Atmosphere-side inclined surface
16c: Lip edge
17a: First spiral rib (first spiral structure)
17b: Second spiral rib (second spiral structure)
18: Auxiliary seal lip
19a: First spiral rib (first spiral structure)
19b: Second spiral rib (second spiral structure)

The invention claimed is:

1. A bi-directional sealing device acting to seal a gap between a housing of a gear reducer and a rotational shaft that is disposed in a hole in the housing and that bi-directionally rotates, the bi-directional sealing device separating an internal space of the housing in which a grease is stored from an atmosphere side, the bi-directional sealing device comprising:

an outer cylindrical portion adapted to be mounted on the housing;

an inner cylindrical portion located radial inside the outer cylindrical portion;

a connecting circular annular portion connecting an atmosphere-side end of the outer cylindrical portion and an atmosphere-side end of the inner cylindrical portion in radial directions;

a main seal lip protruding radially inward from an inner peripheral surface of the inner cylindrical portion and having an internal-side inclined surface disposed on a side of the internal space and an atmosphere-side inclined surface disposed on the atmosphere side, the main seal lip being in slidable contact with an outer peripheral surface of the rotational shaft;

an auxiliary seal lip protruding radially inward and toward the internal space and extending from and contiguous with the internal-side inclined surface of the main seal lip, the auxiliary seal lip being in slidable contact with the outer peripheral surface of the rotational shaft;

multiple first spiral structures formed on the atmosphere-side inclined surface of the main seal lip and/or an inner peripheral surface of the auxiliary seal lip and extending obliquely; and multiple second spiral structures formed on the atmospheric inclined surface of the main seal lip and/or the inner peripheral surface of the auxiliary seal lip and extending obliquely and symmetrically to the first spiral structures.

2. The bi-directional sealing device according to claim 1, wherein the multiple first spiral structures are formed on both the atmosphere-side inclined surface of the main seal lip and the inner peripheral surface of the auxiliary seal lip, and wherein the multiple second spiral structures are formed on both the atmosphere-side inclined surface of the main seal lip and the inner peripheral surface of the auxiliary seal lip.

3. The bi-directional sealing device according to claim 1, wherein the auxiliary seal lip does not have an opening that causes communication of a side on the internal space of the auxiliary seal lip and the atmosphere side.

4. A gear reducer comprising:
a housing having an internal space in which a grease is stored;
a rotational shaft that is disposed in a hole in the housing and that bi-directionally rotates; and
a bi-directional sealing device acting to seal a gap between the housing and the rotational shaft, the bi-directional sealing device separating the internal space of the housing from an atmosphere side,
the bi-directional sealing device comprising:
an outer cylindrical portion mounted on the housing;
an inner cylindrical portion located radial inside the outer cylindrical portion;
a connecting circular annular portion connecting an atmosphere-side end of the outer cylindrical portion and an atmosphere-side end of the inner cylindrical portion in radial directions;
a main seal lip protruding radially inward from an inner peripheral surface of the inner cylindrical portion and having an internal-side inclined surface disposed on a side of the internal space and an atmosphere-side inclined surface disposed on the atmosphere side, the main seal lip being in slidable contact with an outer peripheral surface of the rotational shaft;
an auxiliary seal lip protruding radially inward and toward the internal space and extending from and contiguous with the internal-side inclined surface of the main seal lip, the auxiliary seal lip being in slidable contact with the outer peripheral surface of the rotational shaft;
multiple first spiral structures formed on the atmosphere-side inclined surface of the main seal lip and/or an inner peripheral surface of the auxiliary seal lip and extending obliquely; and
multiple second spiral structures formed on the atmospheric inclined surface of the main seal lip and/or the inner peripheral surface of the auxiliary seal lip and extending obliquely and symmetrically to the first spiral structures.

5. The gear reducer according to claim 4, wherein the multiple first spiral structures are formed on both the atmosphere-side inclined surface of the main seal lip and the inner peripheral surface of the auxiliary seal lip, and wherein the multiple second spiral structures are formed on both the atmosphere-side inclined surface of the main seal lip and the inner peripheral surface of the auxiliary seal lip.

6. The gear reducer according to claim 4, wherein the auxiliary seal lip does not have an opening that causes communication of a side on the internal space of the auxiliary seal lip and the atmosphere side.

* * * * *